US012757246B2

(12) United States Patent
Chiang et al.

(10) Patent No.: US 12,757,246 B2
(45) Date of Patent: Oct. 6, 2026

(54) METHOD FOR PERFORMING AIRTIME FAIRNESS CONTROL OF MESH NETWORK, AND ASSOCIATED APPARATUS

(71) Applicant: MEDIATEK INC., Hsin-Chu (TW)

(72) Inventors: Ping-Hsien Chiang, Hsinchu City (TW); Chen-Hung Wen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 297 days.

(21) Appl. No.: 18/533,143

(22) Filed: Dec. 7, 2023

(65) Prior Publication Data

US 2024/0306193 A1 Sep. 12, 2024

Related U.S. Application Data

(60) Provisional application No. 63/488,979, filed on Mar. 8, 2023.

(51) Int. Cl.
*H04W 74/04* (2009.01)
*H04W 84/18* (2009.01)

(52) U.S. Cl.
CPC ............ *H04W 74/04* (2013.01); *H04W 84/18* (2013.01)

(58) Field of Classification Search
CPC ... H04W 28/021; H04W 28/16; H04W 40/24; H04W 72/27; H04W 74/006; H04W 74/08; H04W 84/18; H04W 84/22; H04W 92/20; H04B 7/155; H04B 7/15542; H04B 7/2606
See application file for complete search history.

(56) References Cited

U.S. PATENT DOCUMENTS

| | | | | |
|---|---|---|---|---|
| 2019/0007966 | A1* | 1/2019 | Cariou | H04W 74/006 |
| 2020/0389808 | A1* | 12/2020 | Wong | H04W 28/0236 |
| 2021/0314238 | A1* | 10/2021 | Cioffi | H04L 41/5067 |
| 2023/0164632 | A1* | 5/2023 | Mattaparti | H04W 40/24 370/329 |
| 2024/0098549 | A1* | 3/2024 | Huang | H04W 28/0231 |

* cited by examiner

*Primary Examiner* — Awet Haile
(74) *Attorney, Agent, or Firm* — Winston Hsu

(57) ABSTRACT

A method for performing airtime fairness control of mesh network and associated apparatus (e.g., wireless communications devices) are provided. The method may include: utilizing a first wireless communications device to receive at least one first packet carrying at least one indication related to at least one second station (STA) device from a second wireless communications device; determining a first expected airtime of at least one first STA device connected to the first wireless communications device and a second expected airtime of the at least one second STA device at least according to the at least one indication; and controlling first medium-access operations of the at least one first STA device and second medium-access operations of the at least one second STA device according to the first expected airtime and the second expected airtime in time-division manner, for balancing respective airtime of all currently connected STA devices of the mesh network.

20 Claims, 12 Drawing Sheets

METHOD FOR PERFORMING AIRTIME FAIRNESS CONTROL OF MESH NETWORK, AND ASSOCIATED APPARATUS

CROSS REFERENCE TO RELATED APPLICATIONS

This application claims the benefit of U.S. Provisional Application No. 63/488,979, filed on Mar. 8, 2023. The content of the application is incorporated herein by reference.

BACKGROUND

The present invention is related to communications control, and more particularly, to a method for performing airtime fairness control of a mesh network, and the associated apparatus such as at least one wireless communications device (e.g., at least one access point (AP) device) within the mesh network.

According to the related art, multiple AP devices of a mesh network may be arranged to communicate with each other to provide a Wi-Fi communications service, and more particularly, route data for multiple station (STA) devices with proper paths between workable AP devices, in order to achieve better performance. When there are many STA devices, one or more problems may occur. For example, a first STA device that is closer to a certain node in the mesh network may have a longer airtime to receive or transmit data while a second STA device that is far from this node in the mesh network may have a much shorter airtime to receive or transmit data, causing unfairness between the respective users of the first STA device and the second STA device. Some suggestions may be proposed to try solving the problems, but further problems such as some side effects may be introduced. Thus, a novel method and associated architecture are needed for solving the problems without introducing any side effect or in a way that is less likely to introduce a side effect.

SUMMARY

It is an objective of the present invention to provide a method for performing airtime fairness control of a mesh network, and the associated apparatus such as at least one wireless communications device (e.g., at least one AP device) within the mesh network, in order to solve the above-mentioned problems.

At least one embodiment of the present invention provides a method for performing airtime fairness control of a mesh network, where the mesh network may comprise a first wireless communications device and at least one other wireless communications device. For example, the method may comprise: utilizing the first wireless communications device to receive at least one first packet from a second wireless communications device among the at least one other wireless communications device, the at least one first packet carrying at least one indication related to at least one second STA device connected to the at least one other wireless communications device; determining a first expected airtime of at least one first STA device connected to the first wireless communications device and a second expected airtime of the at least one second STA device at least according to the at least one indication; and controlling first medium-access operations of the at least one first STA device and second medium-access operations of the at least one second STA device according to the first expected airtime and the second expected airtime in a time-division manner, for balancing respective airtime of all currently connected STA devices of the mesh network.

At least one embodiment of the present invention provides an associated apparatus that operates according to the method mentioned above, where the apparatus may comprise the first wireless communications device. For example, the first wireless communications device is arranged to determine the first expected airtime of the at least one first STA device and the second expected airtime of the at least one second STA device at least according to the at least one indication; and the first wireless communications device is arranged to control the first medium-access operations of the at least one first STA device and control, through the second wireless communications device, the second medium-access operations of the at least one second STA device according to the first expected airtime and the second expected airtime in the time-division manner, for balancing the respective airtime of said all currently connected STA devices of the mesh network.

At least one embodiment of the present invention provides an associated apparatus that operates according to the method mentioned above, where the apparatus may comprise the second wireless communications device. For example, the second wireless communications device is arranged to send the at least one first packet carrying the at least one indication to the first wireless communications device; the first wireless communications device is arranged to determine the first expected airtime of the at least one first STA device and the second expected airtime of the at least one second STA device at least according to the at least one indication; and the first wireless communications device is arranged to control the first medium-access operations of the at least one first STA device and control, through the second wireless communications device, the second medium-access operations of the at least one second STA device according to the first expected airtime and the second expected airtime in the time-division manner, for balancing the respective airtime of said all currently connected STA devices of the mesh network.

It is an advantage of the present invention that, through proper design, the present invention method and the associated apparatus such as the wireless communications devices within the mesh network can adaptively control the medium-access operations of the STA devices according to the first expected airtime, the second expected airtime, etc. in the time-division manner, in order to balance the respective airtime of all currently connected STA devices of the mesh network. In addition, the present invention method and the associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
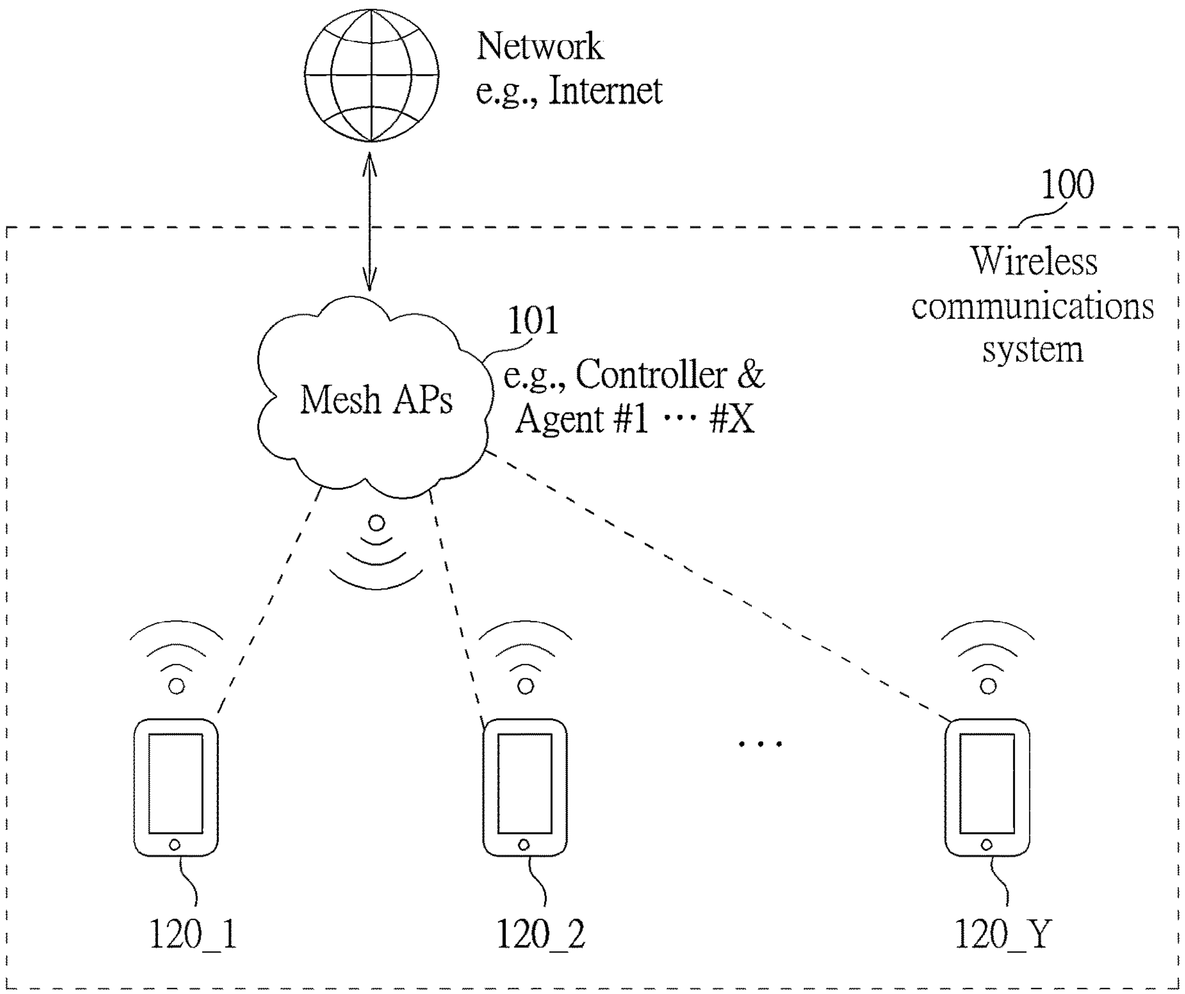
FIG. 1A is a diagram of a wireless communications system according to an embodiment of the present invention.

FIG. 1A is a diagram of a wireless communications system 100 according to an embodiment of the present invention. For better comprehension, the wireless communications system 100 may be coupled to at least one network such as the Internet, and the wireless communications system 100 (or any device therein) may be compatible or back-compatible to one or more versions of the Institute of Electrical and Electronics Engineers (IEEE) 802.11 standards, but the present invention is not limited thereto. In addition, the wireless communications system 100 may comprise a plurality of wireless communications devices such as (X+1) AP devices acting as (X+1) mesh APs 101 in a mesh network, and may comprise more wireless communications devices such as Y STA devices 120_1, 120_2, . . . and 120_Y acting as Y client devices of the mesh network, where "X" may represent an integer that is greater than one, and "Y" may represent a positive integer. More particularly, the mesh network may comprise a controller such as a mesh AP among the (X+1) mesh APs 101 that is capable of controlling the whole mesh network, and further comprise X agents #1 . . . #X such as X remaining mesh APs among the (X+1) mesh APs 101 that are capable of dynamically changing their backhaul links and/or topology to form an optimal mesh network architecture among various mesh network architectures, in order to improve the reliability of the mesh network while the mesh network is providing a wireless communications service such as a Wi-Fi communications service under control of the controller, but the present invention is not limited thereto. According to some embodiments, the architecture shown in FIG. 1A may vary.

Figure 1B:
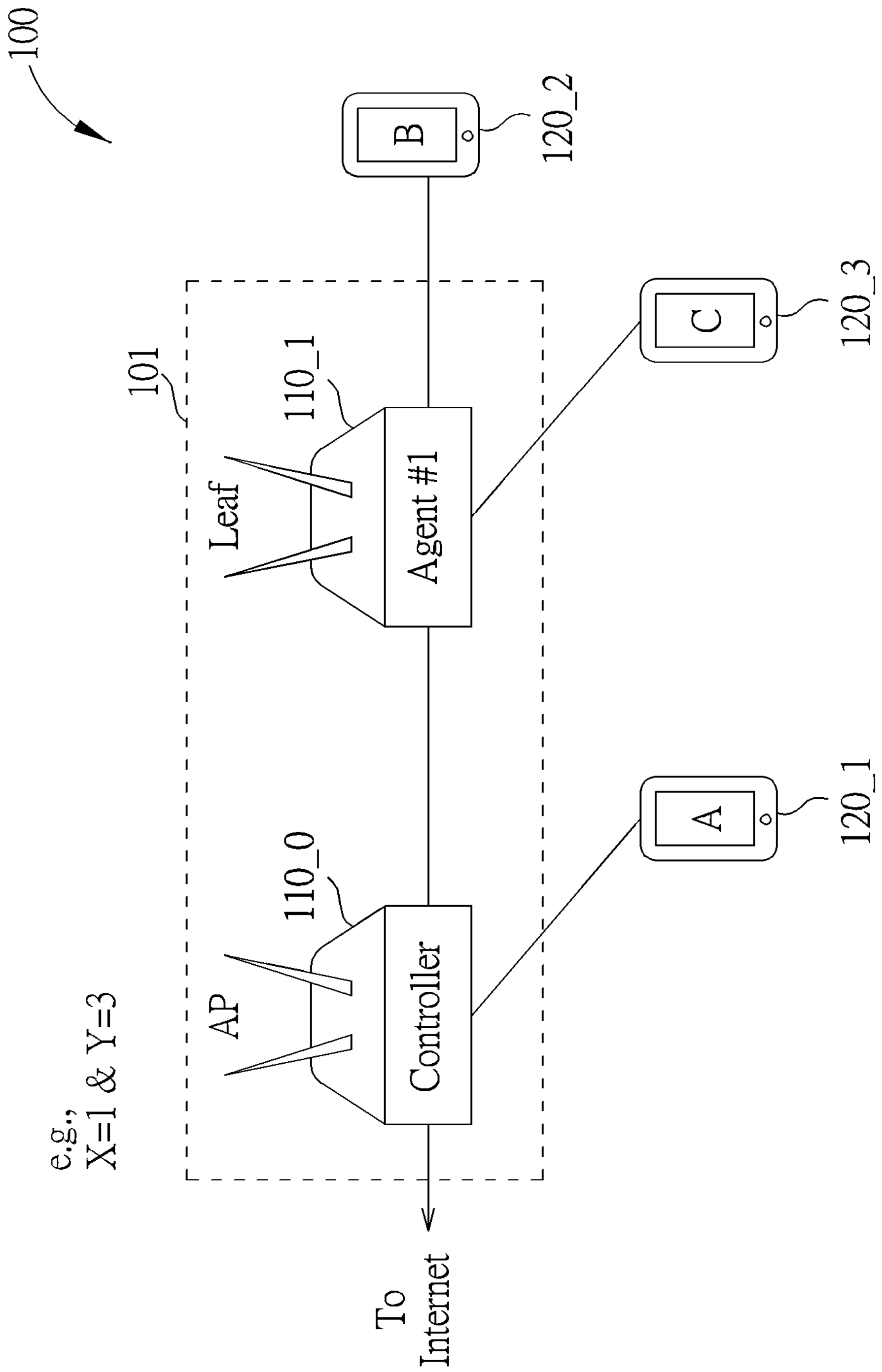
FIG. 1B is a diagram illustrating some implementation details of the wireless communications system shown in FIG. 1A according to an embodiment of the present invention.

FIG. 1B is a diagram illustrating some implementation details of the wireless communications system 100 shown in FIG. 1A according to an embodiment of the present invention. The (X+1) AP devices acting as the (X+1) mesh APs 101 may comprise an AP device 110_0 configured as the controller, and X AP devices 110_1 . . . and 110_X configured as the X agents #1 . . . #X. For example, when X=1 and Y=3, the X AP devices 110_1 . . . and 110_X configured as the X agents #1 . . . #X may comprise the AP device 110_1 configured as the agent #1, and the Y STA devices 120_1, 120_2, . . . and 120_Y acting as the Y client devices may comprise the STA devices 120_1, 120_2 and 120_3 acting as the client devices A, B and C, where the AP device 110_0 configured as the controller and the AP device 110_1 configured as the agent #1 may be labeled "AP" and "Leaf" for indicating a main mesh architecture and a secondary mesh architecture (e.g., a leaf architecture), respectively, but the present invention is not limited thereto. According to some embodiments, the architecture shown in FIG. 1A may vary. For example, the agent count X of the X agents #1 . . . #X, the STA count Y of the Y STA devices 120_1, 120_2, . . . and 120_Y, and/or the associated runtime topology (e.g., the backhaul links between the (X+1) mesh APs 101 and the fronthaul links between the X agents #1 . . . #X and the Y STA devices 120_1, 120_2, . . . and 120_Y) may vary.

Figure 1C:
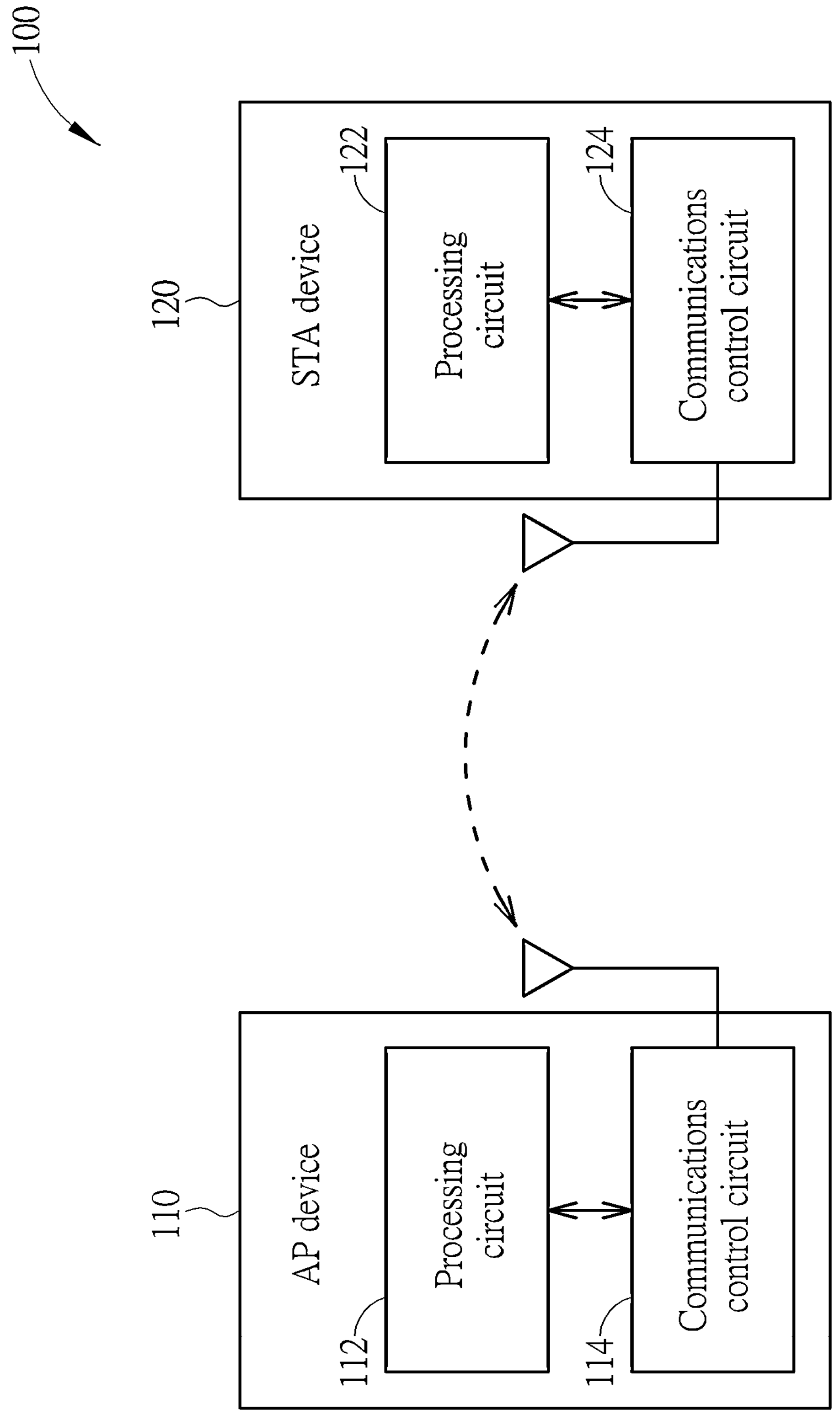
FIG. 1C is a diagram illustrating a set of wireless communications devices within the wireless communications system shown in FIG. 1A according to an embodiment of the present invention.

FIG. 1C is a diagram illustrating an AP device 110 and a STA device 120 within the wireless communications system 100 shown in FIG. 1A according to an embodiment of the present invention. The AP device 110 may represent any AP device among the (X+1) AP devices that is acting as a mesh AP among the (X+1) mesh APs 101, and the STA device 120 may represent any STA device among the Y STA devices 120_1, 120_2, . . . and 120_Y that is acting as a client device among the Y client devices. Examples of the AP device 110 may include, but are not limited to: a Wi-Fi router. Examples of the STA device 120 may include, but are not limited to: a multifunctional mobile phone, a laptop computer, an all-in-one computer and a wearable device. As shown in FIG. 1C, the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124. In the architecture shown in FIG. 1C, the processing circuit 112 can be arranged to control operations of the AP device 110 to make the AP device 110 act as an AP in the wireless communications system 100, and the communications control circuit 114 can be arranged to perform communications control, and more particularly, perform wireless communications operations with the STA device 120 (or the communications control circuit 124 thereof) for the AP device 110. In addition, the processing circuit 122 can be arranged to control operations of the STA device 120 to make the STA device 120 act as a STA in the wireless communications system 100, and the communications control circuit 124 can be arranged to perform communications control, and more particularly, perform wireless communications operations with the AP device 110 (or the communications control circuit 114 thereof) for the STA device 120.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. For the case that the AP device 110 represents the AP device 110_*x* that is configured as the $x^{th}$ agent among the X agents #1 . . . #X (e.g., "x" may represent an integer falling within the range of the interval [1, X]), the communications control circuit 114 can be implemented by way of the aforementioned at least one wireless network control circuit, and the aforementioned at least one wired network control circuit may be omitted. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto.

Figure 2A:
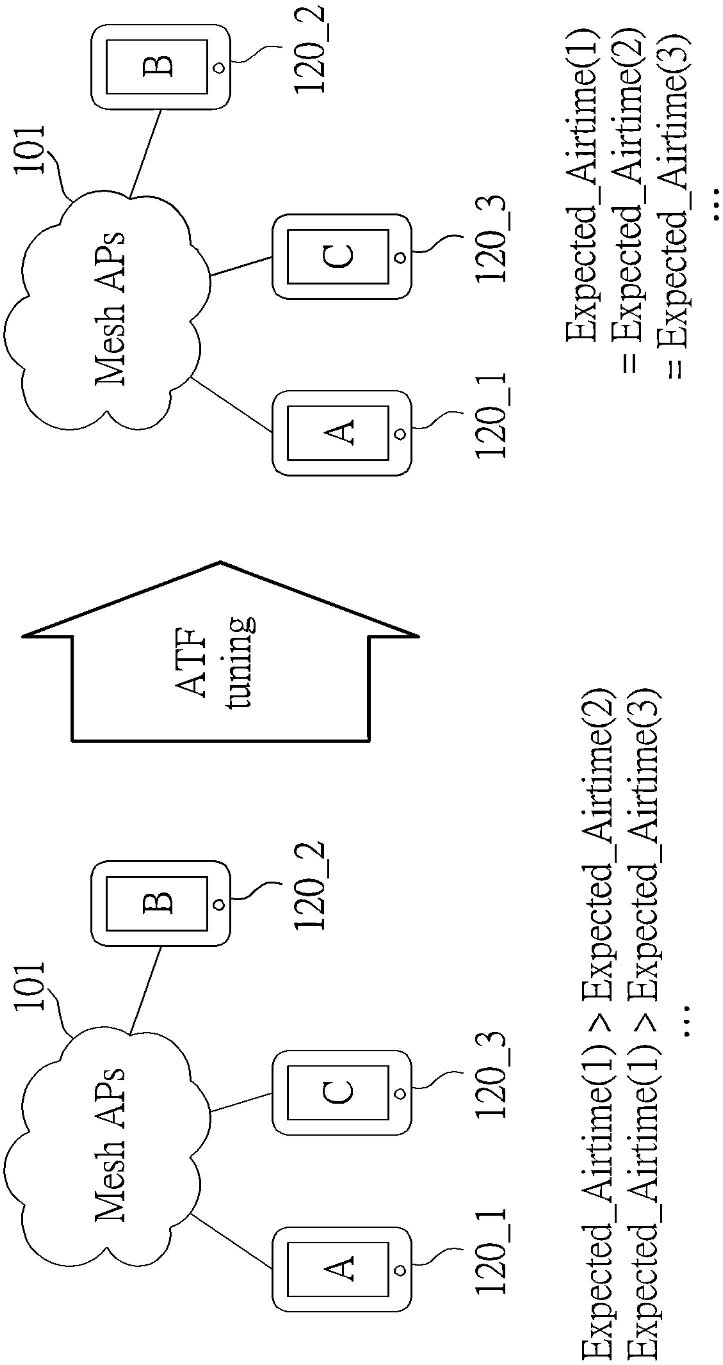
FIG. 2A illustrates, in the right half part thereof, an airtime fairness tuning control scheme of a method for performing airtime fairness control of a mesh network according to an embodiment of the present invention, where a first control scheme is illustrated in the left half part of FIG. 2A for better comprehension.

FIG. 2A illustrates, in the right half part thereof, an airtime fairness tuning control scheme of a method for performing airtime fairness control of a mesh network (e.g., the mesh network mentioned above) according to an embodiment of the present invention, where a first control scheme is illustrated in the left half part of FIG. 2A for better comprehension. Assuming that the wireless communications system 100 shown in FIG. 1A may operate according to the first control scheme, the expected airtime Expected_Airtime (1) of the STA device 120_1 may be greater than the respective expected airtimes {Expected_Airtime(2), . . . , Expected_Airtime(Y)} of the STA devices {120_2, . . . , 120_Y}, such as the expected airtimes Expected_Airtime(2) and Expected_Airtime(3) of the STA devices 120_2 and 120_3 for the case of Y=3, where the expected airtime Expected_Airtime(1) of the STA device 120_1 may be much greater than one or more respective expected airtimes among the respective expected airtimes {Expected_Airtime(2), . . . , Expected_Airtime(Y)} of the STA devices {120_2, . . . , 120_Y} in some situations (e.g., the situations where the (X+1) mesh APs 101 are configured into a multi-leaf mesh network architecture), but the present invention is not limited thereto. The wireless communications system 100 shown in FIG. 1A may operate according to the airtime fairness tuning control scheme, in order to balance the respective expected airtimes Expected_Airtime(1), Expected_Airtime(2), . . . and Expected_Airtime(Y) of the Y STA devices 120_1, 120_2, . . . and 120_Y, such as the expected airtimes Expected_Airtime(1), Expected_Airtime (2) and Expected_Airtime(3) of the STA devices 120_1, 120_2 and 120_3 for the case of Y=3, in order to prevent any unfairness between the respective users of the Y STA devices 120_1, 120_2, . . . and 120_Y. More particularly, after performing airtime fairness tuning (labeled "ATF tuning" for brevity), the respective expected airtimes Expected_Airtime(1), Expected_Airtime(2), . . . and Expected_Airtime(Y) of the Y STA devices 120_1, 120_2, . . . and 120_Y (e.g., Y=3) may be equal to each other.

Figure 2B:
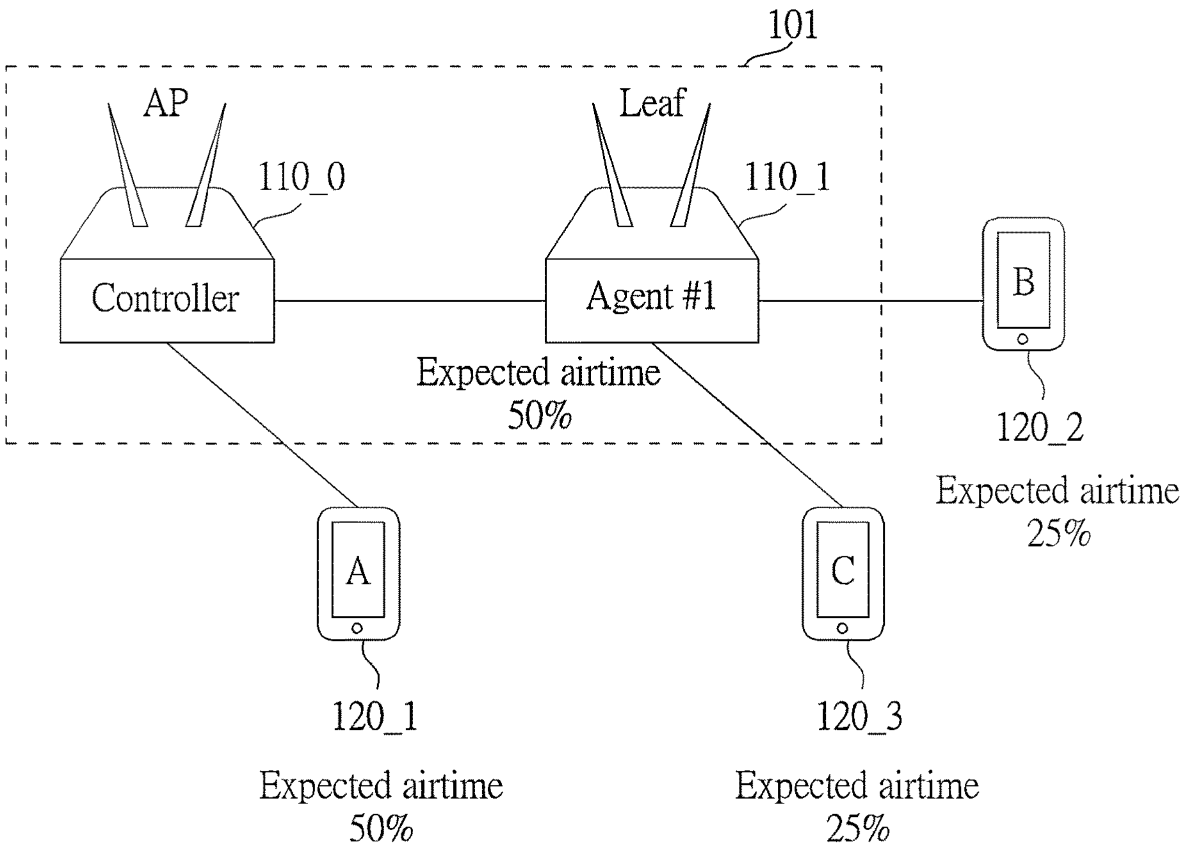
FIG. 2B is a diagram illustrating respective expected airtimes of the STA devices that are controlled with the first control scheme shown in the left half part of FIG. 2A according to an embodiment of the present invention.

FIG. 2B is a diagram illustrating the respective expected airtimes Expected_Airtime(1), Expected_Airtime(2), . . . and Expected_Airtime(Y) of the Y STA devices 120_1, 120_2, . . . and 120_Y that are controlled with the first control scheme shown in the left half part of FIG. 2A according to an embodiment of the present invention. For better comprehension, assuming that X=1 and Y=3, the AP device 110_1 configured as the agent #1 may be illustrated as an example of the X AP devices 110_1 . . . and 110_X, and the STA devices 120_1, 120_2 and 120_3 acting as the client devices A, B and C may be illustrated as an example of the Y STA devices 120_1, 120_2, . . . and 120_Y. The expected airtime Expected_Airtime(1) of the STA device 120_1 may be equal to 50%, the expected airtime Expected_Airtime(2) of the STA device 120_2 may be equal to 25%, and the expected airtime Expected_Airtime(3) of the STA device 120_3 may be equal to 25%, where the expected airtime of the currently connected STA devices of the leaf architecture corresponding to the AP device 110_1, such as the total expected airtime (e.g., the summation (Expected_Airtime(2)+Expected_Airtime(3))) of the respective expected airtimes Expected_Airtime(2) and Expected_Airtime(3) of the STA devices 120_2 and 120_3 that are wirelessly connected to the AP device 110_1, may be equal to 50%, but the present invention is not limited thereto.

Figure 2C:
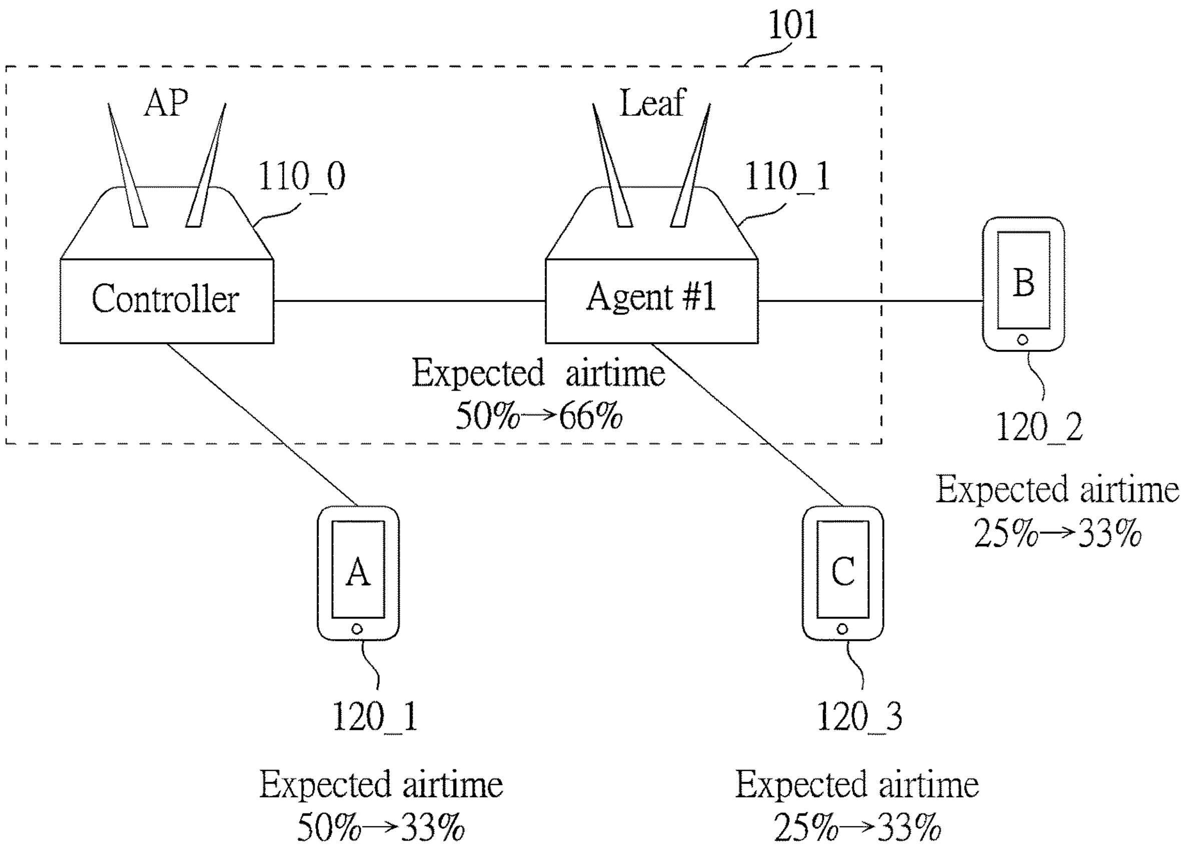
FIG. 2C is a diagram illustrating respective expected airtimes of the STA devices that are controlled with the airtime fairness tuning control scheme shown in the right half part of FIG. 2A according to an embodiment of the present invention.

FIG. 2C is a diagram illustrating the respective expected airtimes Expected_Airtime(1), Expected_Airtime(2), . . . and Expected_Airtime(Y) of the Y STA devices 120_1, 120_2, . . . and 120_Y that are controlled with the airtime fairness tuning control scheme shown in the right half part of FIG. 2A according to an embodiment of the present invention. Assuming that X=1 and Y=3, the AP device 110_1 configured as the agent #1 may be illustrated as an example of the X AP devices 110_1 . . . and 110_X, and the STA devices 120_1, 120_2 and 120_3 acting as the client devices A, B and C may be illustrated as an example of the Y STA devices 120_1, 120_2, . . . and 120_Y. The expected airtimes Expected_Airtime(1), Expected_Airtime(2) and Expected_Airtime(3) of the STA devices 120_1, 120_2 and 120_3 may be equal to 33%, and more particularly, may be respectively changed from the unbalanced values of 50%, 25% and 25% as described in the embodiment shown in FIG. 2B to 33% (respectively labeled "50%→33%", "25%→33%" and "25%→33%" for brevity). In addition, the expected airtime of the currently connected STA devices of the leaf architecture corresponding to the AP device 110_1, such as the total expected airtime (e.g., the summation (Expected_Airtime(2)+Expected_Airtime(3))) of the respective expected airtimes Expected_Airtime(2) and Expected_Airtime(3) of the STA devices 120_2 and 120_3 that are wirelessly connected to the AP device 110_1, may be equal to 66%, and more particularly, may be changed from the value of 50% as described in the embodiment shown in FIG. 2B to 66% (labeled "50%→66%" for brevity).

Some implementation details regarding the airtime fairness tuning control scheme may be further described as follows. The plurality of wireless communications devices mentioned above may comprise a first wireless communications device, such as the AP device 110_0 configured as the controller, and at least one other wireless communications device, such as the X AP devices 110_1 . . . and 110_X configured as the X agents #1 . . . #X. Taking the architecture shown in FIG. 1B as an example of the architecture shown in the right half part of FIG. 2A, at least one first STA device (e.g., the STA device 120_1) may be connected to the first wireless communications device (e.g., the AP device 110_0), and the first wireless communications device may store the associated information for indicating that the aforementioned at least one first STA device has been connected to the first wireless communications device, where the aforementioned at least one first STA device may be wirelessly connected to the first wireless communications device via at least one first wireless connection. Similarly, at least one second STA device (e.g., the STA devices 120_2 . . . and 120_Y, such as the STA devices 120_2 and 120_3 for the case of Y=3) may be connected to the aforementioned at least one other wireless communications device (e.g., the AP device 110_1), and the aforementioned at least one other wireless communications device may store the associated information for indicating that the aforementioned at least one second STA device has been connected to the aforementioned at least one other wireless communications device, where the aforementioned at least one second STA device may be wirelessly connected to the aforementioned at least one other wireless communications device via at least one second wireless connection.

Based on the airtime fairness tuning control scheme, the first wireless communications device such as the AP device 110_0 may refer to the runtime topology of the mesh network to determine the respective expected airtimes Expected_Airtime(1), Expected_Airtime(2), . . . and Expected_Airtime(Y)) of the STA devices 120_1, 120_2, . . . and 120_Y, for example, according to the ways that the STA devices {120} (e.g., the STA devices 120_1, 120_2, . . . and 120_Y) are connected to the AP devices {110} (e.g., the AP devices 110_0, 110_1 . . . and 110_X), and the associated operations may comprise:

(1) a second wireless communications device among the aforementioned at least one other wireless communications device, such as the AP device 110_1 configured as the agent #1, may send at least one first packet carrying at least one indication related to the aforementioned at least one second STA device connected to the aforementioned at least one other wireless communications device to the first wireless communications device such as the AP device 110_0;

(2) the first wireless communications device such as the AP device 110_0 may receive the aforementioned at least one first packet carrying the aforementioned at least one indication from the second wireless communications device such as the AP device 110_1, for example, the aforementioned at least one indication may indicate the ways that the aforementioned at least one second STA device is connected to the aforementioned at least one other wireless communications device (e.g., the X AP devices 110_1 . . . and 110_X configured as the X agents #1 . . . #X);

(3) the first wireless communications device such as the AP device 110_0 may determine a first expected airtime (e.g., the expected airtime Expected_Airtime(1)) of the aforementioned at least one first STA device (e.g., the STA device 120_1) connected to the first wireless communications device and a second expected airtime (e.g., the summation (Expected_Airtime(2)+Expected_Airtime(3)) of the expected airtimes Expected_Airtime(2) and Expected_Airtime(3)) of the aforementioned at least one second STA device (e.g., the STA devices 120_2 and 120_3) at least according to the aforementioned at least one indication; and (4) the first wireless communications device such as the AP device 110_0 may control first medium-access operations of the aforementioned at least one first STA device (e.g., the STA device 120_1) and second medium-access operations of the aforementioned at least one second STA device (e.g., the STA devices 120_2 and 120_3) according to the first expected airtime (e.g., the expected airtime Expected_Airtime(1)) and the second expected airtime (e.g., the summation (Expected_Airtime(2)+Expected_Airtime(3)) of the expected airtimes Expected_Airtime(2) and Expected_Airtime(3)) in a time-division manner, for balancing the respective airtime (e.g., the expected airtimes Expected_Airtime(1), Expected_Airtime(2) and Expected_Airtime(3)) of all currently connected STA devices (e.g., the STA devices 120_1, 120_2 and 120_3) of the mesh network;

where the first medium-access operations may comprise both of wireless transmission operations to the aforementioned at least one first STA device and wireless transmission operations from the aforementioned at least one first STA device, and the second medium-access operations may comprise both of wireless transmission operations to the aforementioned at least one second STA device and wireless transmission operations from the aforementioned at least one second STA device, but the present invention is not limited thereto. For example, the first medium-access operations and the second medium-access operations may vary. According to some embodiments, the first medium-access operations may comprise downlink (DL) wireless transmission operations regarding the aforementioned at least one first STA device, and the second medium-access operations may comprise DL wireless transmission operations regarding the aforementioned at least one second STA device; and/or the first medium-access operations may comprise uplink (UL) wireless transmission operations regarding the aforementioned at least one first STA device, and the second medium-access operations may comprise UL wireless transmission operations regarding the aforementioned at least one second STA device.

According to some embodiments, the expected airtimes such as the respective expected airtimes Expected_Airtime (1), Expected_Airtime(2), . . . and Expected_Airtime(Y) of the Y STA devices 120_1, 120_2, . . . and 120_Y, the expected airtime of the currently connected STA devices of the leaf architecture corresponding to any AP device 110_*x* configured as the agent #x, etc. may be expressed with the values of percentages, where the leaf architecture corresponding to the aforementioned any AP device 110_*x* may comprise all AP devices within the partial architecture belonging to the AP device 110_*x* within the mesh network architecture, such as the AP device 110_*x* and any other AP device coupled to the controller through the AP device 110_*x* (if the aforementioned any other AP device exists), but the present invention is not limited thereto. According to some embodiments, the expected airtimes such as the respective expected airtimes Expected_Airtime(1), Expected_Airtime (2), . . . and Expected_Airtime(Y) of the Y STA devices 120_1, 120_2, . . . and 120_Y, the expected airtime of the currently connected STA devices of the leaf architecture corresponding to any AP device 110_*x* configured as the agent #x, etc. may be expressed with lengths of time, such as the time lengths that are obtained from multiplying a reference time period (e.g., a predetermined length of time) by the values of percentages, respectively, and therefore may be measured in unit of seconds (s), milliseconds (ms), etc., but the present invention is not limited thereto.

Figure 3A:
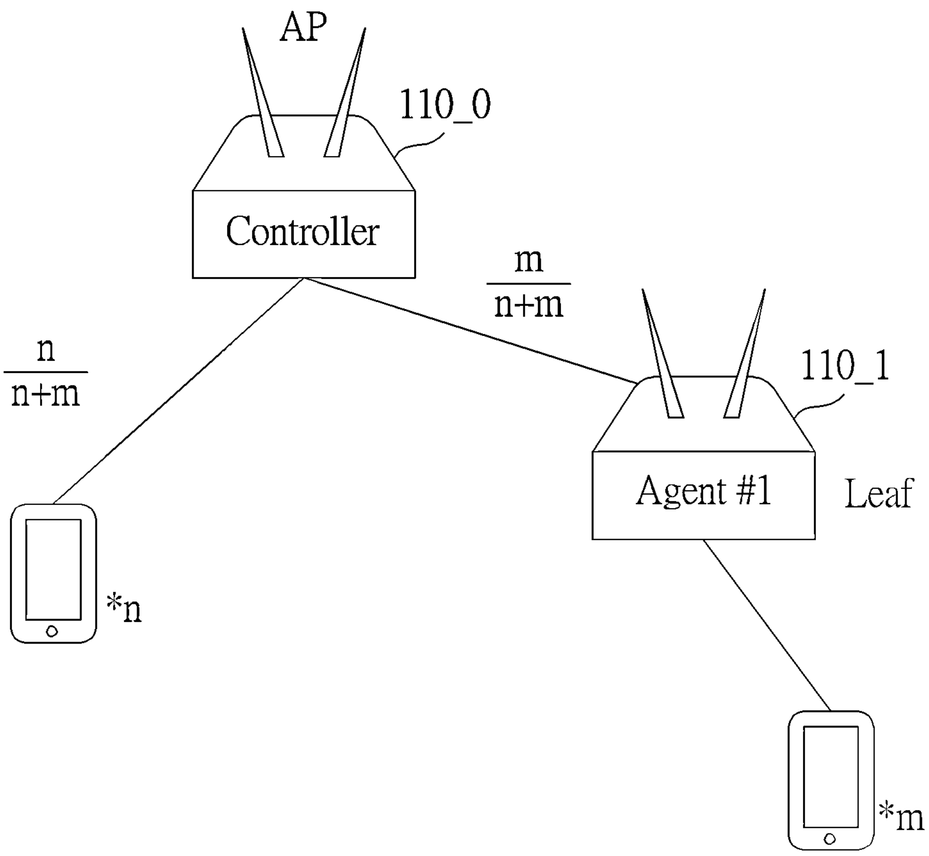
FIG. 3A illustrates a first set of expected airtimes involved with the method according to an embodiment of the present invention.

FIG. 3A illustrates a first set of expected airtimes involved with the method according to an embodiment of the present invention. For example, assuming that X=1 and Y=N=(n+m), the aforementioned at least one first STA device such as the STA devices {120_1, . . . , 120_*n*} may be connected to the first wireless communications device such as the AP device 110_0, and the aforementioned at least one second STA device such as the STA devices {120_(*n*+1), . . . , 120_(*n*+*m*)} may be connected to the aforementioned at least one other wireless communications device such as the AP device 110_1. In this situation, the first expected airtime of the aforementioned at least one first STA device connected to the first wireless communications device, such as the total expected airtime (e.g., the summation (Expected_Airtime(1)+ . . . +Expected_Airtime(n))) of the respective expected airtimes {Expected_Airtime(1), . . . , Expected_Airtime(n)} of the STA devices {120_1, . . . , 120_*n*}, may be equal to (n/N) such as (n/(n+m)), and the second expected airtime of the aforementioned at least one second STA device connected to the aforementioned at least one other wireless communications device, such as the total expected airtime (e.g., the summation (Expected_Airtime (n+1)+ . . . +Expected_Airtime(n+m))) of the respective expected airtimes {Expected_Airtime(n+1), . . . , Expected_Airtime(n+m)} of the other STA devices {120_(*n*+1), . . . , 120_(*n*+*m*)}, may be equal to ((N−n)/N) or (m/N)), such as (m/(n+m)), where "n" may represent a first STA count of the aforementioned at least one first STA device, "m" may represent a second STA count of the aforementioned at least one second STA device in this embodiment, and "N" may represent a total STA count Y (e.g., Y=(n+m)) of the aforementioned at least one first STA device and the aforementioned at least one second STA device, such as the STA count Y of the Y STA devices 120_1, 120_2, . . . and 120_Y. In addition, when determining the first expected airtime of the aforementioned at least one first STA device connected to the first wireless communications device and the second expected airtime of the aforementioned at least one second STA device at least according to the aforementioned at least one indication, the first wireless communications device such as the AP device 110_0 may determine an expected airtime of each first STA device among the aforementioned at least one first STA device (e.g., the STA devices {120_1, . . . , 120_*n*}) to be equal to (1/N), and determine an expected airtime of each second STA device among the aforementioned at least one second STA device (e.g., the other STA devices {120_(*n*+1), . . . , 120_(*n*+*m*)}) to be equal to (1/N).

Among the (n+m) STA devices {120_1, . . . , 120_(*n*+*m*)}, n STA devices such as the STA devices {120_1, . . . , 120_*n*} may be connected to the AP device 110_0 (labeled "*n" for brevity), and m STA devices such as the STA devices {120_(*n*+1), . . . , 120_(*n*+*m*)} may be connected to the AP device 110_1 (labeled "*m" for brevity). As shown in FIG. 3A, the wireless communications device count of the aforementioned at least one other wireless communications device (e.g., the AP device 110_1 configured as the agent #1) may be equal to one, and the second expected airtime (e.g., (m/(n+m))) of the aforementioned at least one second STA device may be regarded as the expected airtime of the currently connected STA devices of the leaf architecture corresponding to the AP device 110_1 configured as the agent #1 (labeled "Leaf" for brevity), but the present invention is not limited thereto. According to some embodiments, the wireless communications device count of the aforementioned at least one other wireless communications device, the leaf architectures corresponding to the AP devices 110_1 . . . and 110_X configured as the agents #1 . . . and #X, and/or the associated arrangement of the leaf architectures may vary.

Figure 3B:
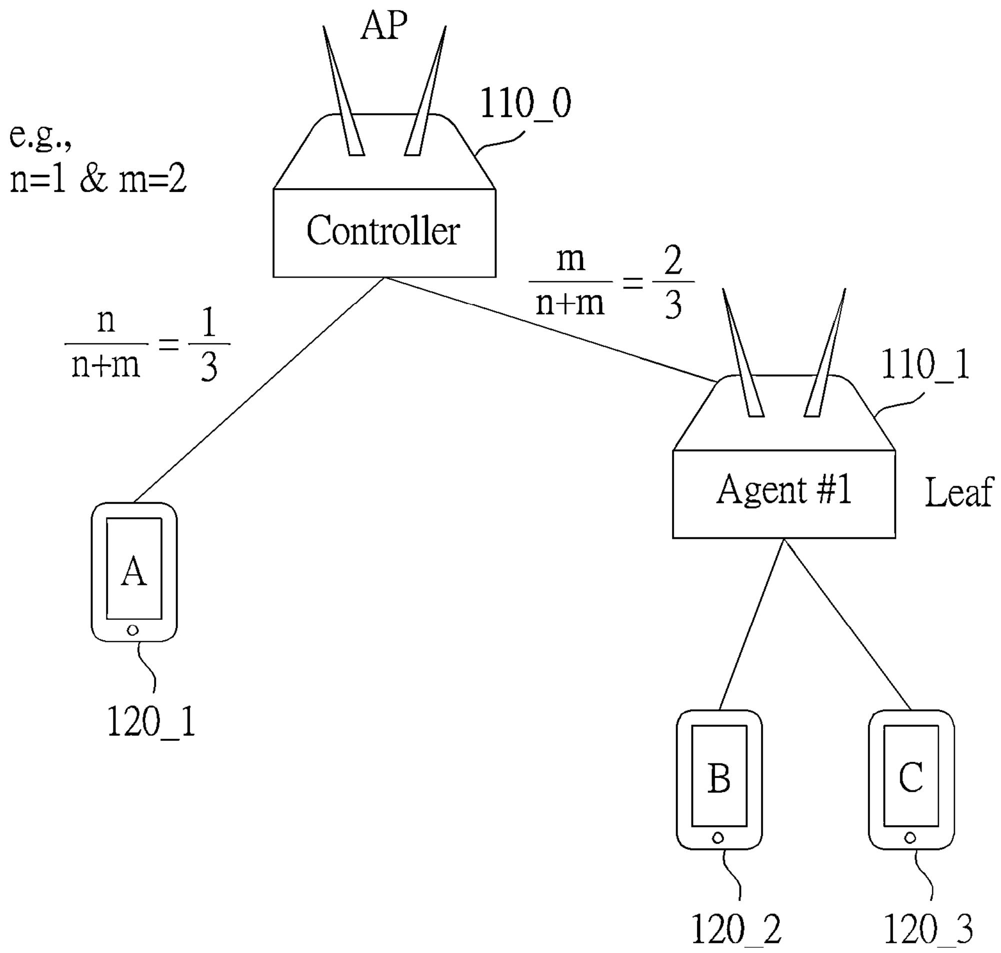
FIG. 3B illustrates some implementation details related to the first set of expected airtimes shown in FIG. 3A according to an embodiment of the present invention.

FIG. 3B illustrates some implementation details related to the first set of expected airtimes shown in FIG. 3A according to an embodiment of the present invention. For example, assuming that n=1 and m=2, the STA devices {120_1, . . . , 120_*n*} may comprise the STA device 120_1 acting as the client device A, and the STA devices {120_(*n*+1), . . . , 120_(*n*+*m*)} may comprise the STA devices 120_2 and 120_3 acting as the client devices B and C, where the first expected airtime (e.g., the expected airtime Expected_Airtime(1) of the STA device 120_1) such as the expected airtime (n/(n+m)) shown in FIG. 3A may be equal to (⅓), and the second expected airtime (e.g., the summation (Expected_Airtime(2)+Expected_Airtime(3)) of the respective expected airtimes {Expected_Airtime(2), Expected_Airtime (3)} of the STA devices {120_2, 120_3}) such as the expected airtime (m/(n+m)) shown in FIG. 3A may be equal to (⅔), but the present invention is not limited thereto.

Figure 4A:
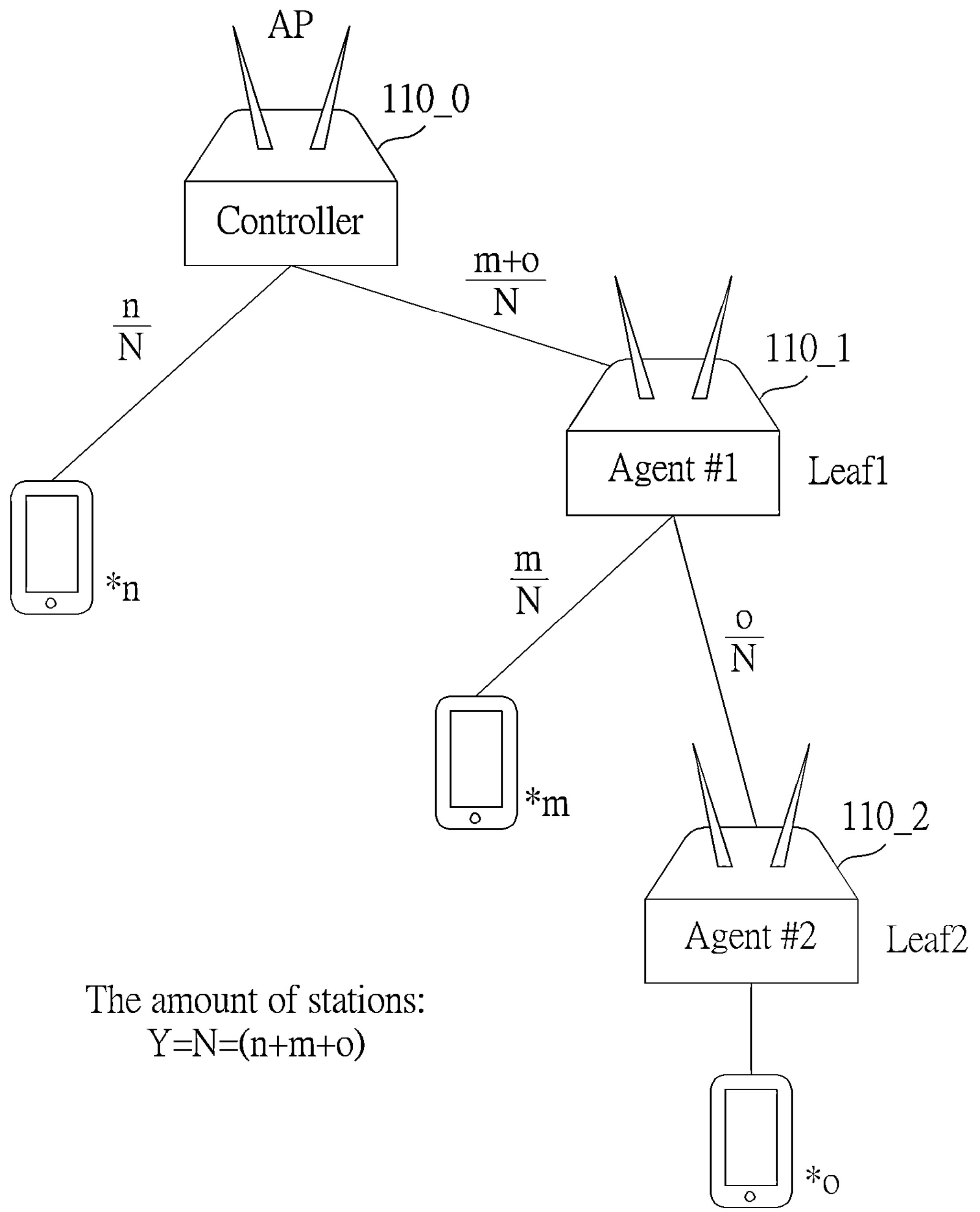
FIG. 4A illustrates a second set of expected airtimes involved with the method according to an embodiment of the present invention.

FIG. 4A illustrates a second set of expected airtimes involved with the method according to an embodiment of the present invention. Assuming that X=2 and Y=N=(n+m+o), the aforementioned at least one first STA device such as the STA devices {120_1, . . . , 120_*n*} may be connected to the first wireless communications device such as the AP device 110_0, and the aforementioned at least one second STA device such as the STA devices {120_(*n*+1), . . . , 120_(*n*+*m*), 120_(*n*+*m*+1), . . . , 120_(*n*+*m*+*o*)} may be connected to the aforementioned at least one other wireless communications device such as the AP devices 110_1 and 110_2. In this situation, the first expected airtime of the aforementioned at least one first STA device connected to the first wireless communications device, such as the total expected airtime (e.g., the summation (Expected_Airtime (1)+ . . . +Expected_Airtime(n) of the respective expected airtimes {Expected_Airtime(1), . . . , Expected_Airtime(n)} of the STA devices {120_1, . . . , 120_*n*}, may be equal to (n/N) such as (n/(n+m+o)), and the second expected airtime of the aforementioned at least one second STA device connected to the aforementioned at least one other wireless communications device, such as the total expected airtime (e.g., the summation (Expected_Airtime(n+1)+ . . . +Expected_Airtime(n+m)+Expected_Airtime(n+m+1)+ . . . +Expected_Airtime(n+m+o))) of the respective expected airtimes {Expected_Airtime(n+1), . . . , Expected_Airtime (n+m), Expected_Airtime(n+m+1), . . . , Expected_Airtime (n+m+o)} of the remaining STA devices {120_(*n*+1), . . . , 120_(*n*+*m*), 120_(*n*+*m*+1), . . . , 120_(*n*+*m*+*o*)}, may be equal to ((N−n)/N) or ((m+o)/N), such as ((m+o)/(n+m+o)), where "n" may represent the first STA count of the aforementioned at least one first STA device, "(m+o)" may represent the second STA count of the aforementioned at least one second STA device, and "N" may represent the total STA count Y of the aforementioned at least one first STA device and the aforementioned at least one second STA device (labeled "Y=N=(n+m+o)" for better comprehension). In addition, when determining the first expected airtime of the aforementioned at least one first STA device connected to the first wireless communications device and the second expected airtime of the aforementioned at least one second STA device at least according to the aforementioned at least one indication, the first wireless communications device such as the AP device 110_0 may determine an expected airtime of each first STA device among the aforementioned at least one first STA device (e.g., the STA devices {120_1, . . . , 120_*n*}) to be equal to (1/N), and determine an expected airtime of each second STA device among the aforementioned at least one second STA device (e.g., the other STA devices {120_(*n*+1), . . . , 120_(*n*+*m*), 120_(*n*+*m*+1), . . . , 120_(*n*+*m*+*o*)}) to be equal to (1/N).

Among the (n+m+o) STA devices {120_1, . . . , 120_(*n*+*m*+*o*)}, n STA devices such as the STA devices {120_1, . . . , 120_*n*} may be connected to the AP device 110_0 (labeled "*n" for brevity), m STA devices such as the STA devices {120_(*n*+1), . . . , 120_(*n*+*m*)} may be connected to the AP device 110_1 (labeled "*m" for brevity), and o STA devices such as the STA devices {120_(*n*+*m*+1), . . . , 120_(*n*+*m*+*o*)} may be connected to the AP device 110_2 (labeled "*o" for brevity). As shown in FIG. 4A, the wireless communications device count of the aforementioned at least one other wireless communications device (e.g., the AP devices 110_1 and 110_2 configured as the agents #1 and #2) may be greater than one, and the second expected airtime (e.g., ((m+o)/N)) of the aforementioned at least one second STA device may be regarded as the expected airtime of the currently connected STA devices of the leaf architecture corresponding to the AP device 110_1 configured as the agent #1 (labeled "Leaf1" for brevity), but the present invention is not limited thereto. For example, the mesh network may further comprise another leaf such as the leaf architecture corresponding to the AP device 110_2 configured as the agent #2 (labeled "Leaf2" for brevity).

More particularly, the aforementioned at least one second STA device such as the STA devices {120_(*n*+1), . . . , 120_(*n*+*m*), 120_(*n*+*m*+1), . . . , 120_(*n*+*m*+*o*)} may comprise one or more second STA devices connected to the second wireless communications device (e.g., the AP device 110_1), such as the STA devices {120_(*n*+1), . . . , 120_(*n*+*m*)}, and further comprise at least one remaining second STA device, such as the remaining second STA devices {120_(*n*+*m*+1), . . . , 120_(*n*+*m*+*o*)} among the STA devices {120_(*n*+1), . . . , 120_(*n*+*m*), 120_(*n*+*m*+1), . . . , 120_(*n*+*m*+*o*)}. The first wireless communications device such as the AP device 110_0 may determine a third expected airtime of the one or more second STA devices (e.g., the m STA devices {120_(*n*+1), . . . , 120_(*n*+*m*)}) and a fourth expected airtime of the aforementioned at least one remaining second STA device (e.g., the o STA devices {120_(*n*+*m*+1), . . . , 120_(*n*+*m*+*o*)}) at least according to the aforementioned at least one indication, and control third medium-access operations of the one or more second STA devices and fourth medium-access operations of the aforementioned at least one remaining second STA device according to the third expected airtime and the fourth expected airtime in the time-division manner, for balancing the respective airtime of the aforementioned all currently connected STA devices (e.g., the STA devices {120_1, . . . , 120_*n*, 120_(*n*+1), . . . , 120_(*n*+*m*), 120_(*n*+*m*+1), . . . , 120_(*n*+*m*+*o*)}) of the mesh network, where the second medium-access operations may comprise the third medium-access operations and the fourth medium-access operations, and any medium-access operation among the third medium-access operations and the fourth medium-access operations may represent one of the wireless transmission operations to the aforementioned at least one second STA device or one of the wireless transmission operations from the aforementioned at least one second STA device, but the present invention is not limited thereto. For example, the aforementioned any wireless transmission operation may represent one of the DL wireless transmission operations regarding the aforementioned at least one second STA device or one of the UL wireless transmission operations regarding the aforementioned at least one second STA device.

The third expected airtime of the one or more second STA devices connected to the second wireless communications device, such as the total expected airtime (e.g., the summation (Expected_Airtime(n+1)+ . . . +Expected_Airtime(n+m))) of the respective expected airtimes {Expected_Airtime (n+1), . . . , Expected_Airtime(n+m)} of the m STA devices {120_(*n*+1), . . . , 120_(*n*+*m*)}, may be equal to (m/N), and the fourth expected airtime of the aforementioned at least one remaining second STA device, such as the total expected airtime (e.g., the summation (Expected_Airtime(n+m+1)+ . . . +Expected_Airtime(n+m+o))) of the respective expected airtimes {Expected_Airtime(n+m+1), . . . , Expected_Airtime(n+m+o)} of the STA devices {120_(*n*+*m*+1), . . . , 120_(*n*+*m*+*o*)}, may be equal to ((N−n-m)/N) such as (o/N), where "m" may represent a third STA count of the one or more second STA devices, and "o" may represent a fourth STA count of the aforementioned at least one remaining second STA device. As shown in FIG. 4A, the second expected airtime (e.g., ((m+o)/N)) may be equal to a summation of the third expected airtime (e.g., (m/N)) and the fourth expected airtime (e.g., (o/N)). In addition, when determining the third expected airtime of the one or more second STA devices connected to the second wireless communications device and the fourth expected airtime of the aforementioned at least one remaining second STA device among the aforementioned at least one second STA device at least according to the aforementioned at least one indication, the first wireless communications device such as the AP device 110_0 may determine an expected airtime of each second STA device among the one or more second STA devices (e.g., the m STA devices {120_(*n*+1), . . . , 120_(*n*+*m*)}) to be equal to (1/N), and also determine an expected airtime of each second STA device among the aforementioned at least one remaining second STA device (e.g., the STA devices {120_(*n*+*m*+1), . . . , 120_(*n*+*m*+*o*)}) to be equal to (1/N). Additionally, the fourth expected airtime (e.g., (o/N)) of the aforementioned at least one remaining second STA device may be regarded as the expected airtime of the currently connected STA devices of the leaf architecture corresponding to the AP device 110_2 configured as the agent #2 (labeled "Leaf2" for brevity).

Figure 4B:
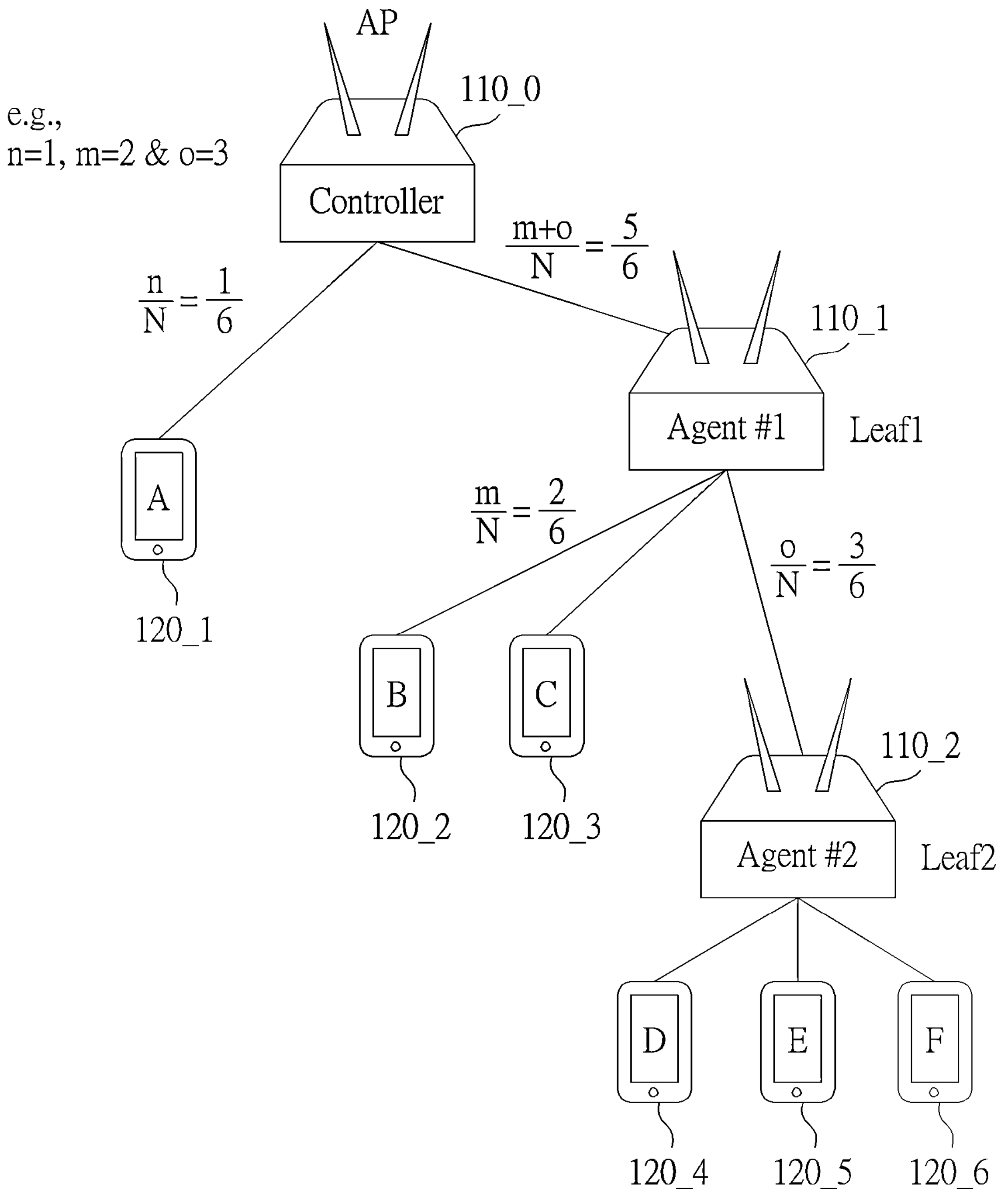
FIG. 4B illustrates some implementation details related to the second set of expected airtimes shown in FIG. 4A according to an embodiment of the present invention.

FIG. 4B illustrates some implementation details related to the second set of expected airtimes shown in FIG. 4A according to an embodiment of the present invention. assuming that n=1, m=2 and o=3, the STA devices {120_1, . . . , 120_*n*} may comprise the STA device 120_1 acting as the client device A, and the STA devices {120_(*n*+1), . . . , 120_(*n*+*m*), 120_(*n*+*m*+1), . . . , 120_(*n*+*m*+*o*)} may comprise the STA devices 120_2, 120_3, 120_4, 120_5 and 120_6 acting as the client devices B, C, D, E and F, where the first expected airtime (e.g., the expected airtime Expected_Airtime(1) of the STA device 120_1) such as the expected airtime (n/N) shown in FIG. 4A may be equal to (1/6), and the second expected airtime (e.g., the summation (Expected_Airtime(2)+Expected_Airtime(3)+Expected_Airtime(4)+Expected_Airtime(5)+Expected_Airtime (6)) of the respective expected airtimes {Expected_Airtime (2), Expected_Airtime(3), Expected_Airtime(4), Expected_Airtime(5), Expected_Airtime(6)} of the STA devices {120_2, 120_3, 120_4, 120_5, 120_6}) such as the expected airtime ((m+o)/N) shown in FIG. 4A may be equal to (5/6), but the present invention is not limited thereto.

According to some embodiments, the first wireless communications device such as the AP device 110_0 may determine the runtime topology of the mesh network according to the aforementioned at least one indication, and the aforementioned at least one indication may comprise one or a combination of at least one medium access control (MAC) address of the aforementioned at least one other wireless communications device (e.g., the X AP devices 110_1 . . . and 110_X configured as the X agents #1 . . . #X) and the second STA count of the aforementioned at least one second STA device (e.g., the m STA devices of the embodiment shown in FIG. 3A, or the (m+o) STA devices such as the combination of the m STA devices and the o STA devices of the embodiment shown in FIG. 4A). For better comprehension, any AP device within the wireless communications system 100, such as the AP device 110_0 configured as the controller and the X AP devices 110_1 . . . and 110_X configured as the X agents #1 . . . #X, may be compatible or back-compatible to one or more versions of the IEEE 1905 standards, but the present invention is not limited thereto.

Figure 5:
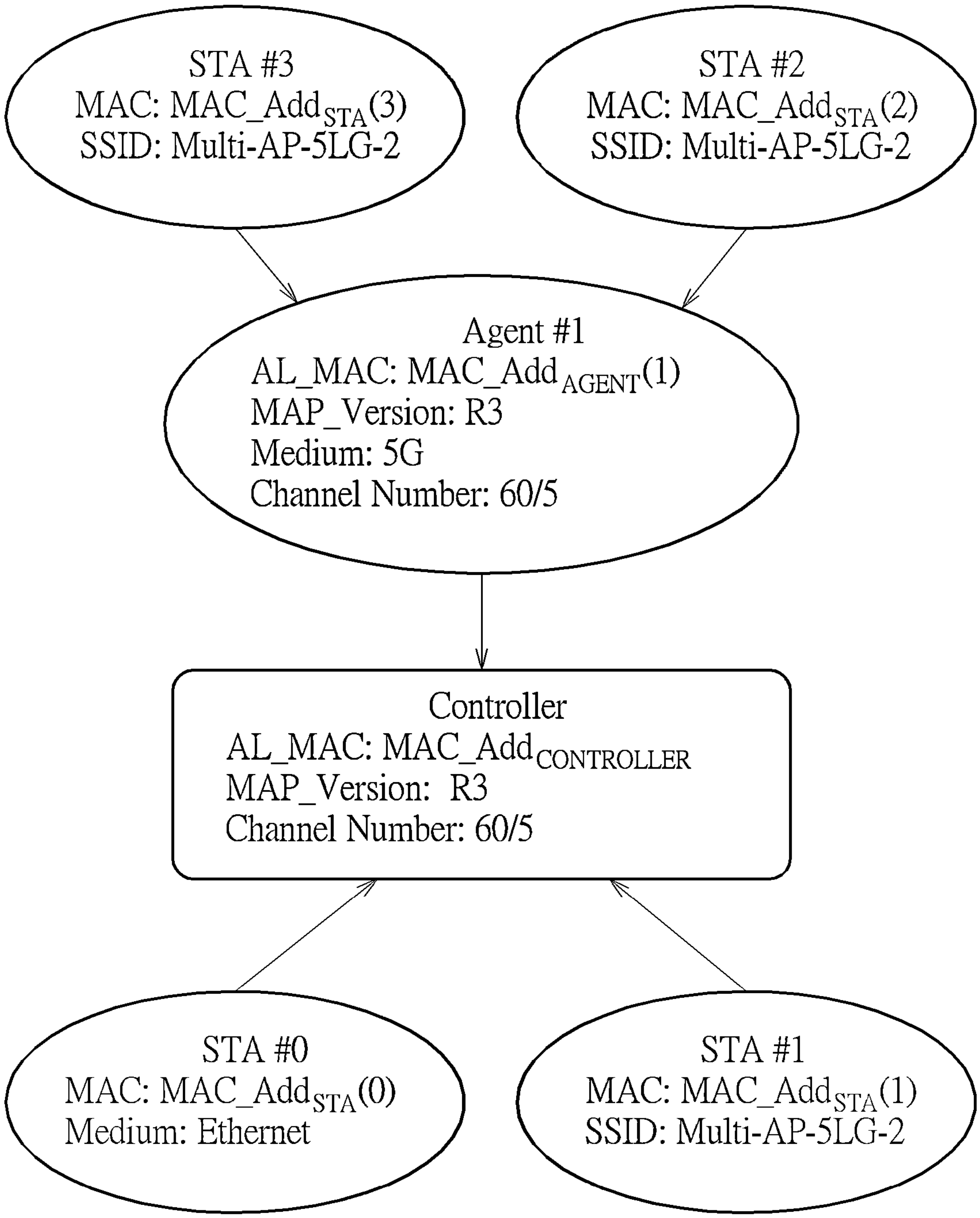
FIG. 5 illustrates a runtime topology control scheme of the method according to an embodiment of the present invention.

FIG. 5 illustrates a runtime topology control scheme of the method according to an embodiment of the present invention. The first wireless communications device such as the AP device 110_0 configured as the controller may operate according to the runtime topology control scheme to determine the runtime topology of the mesh network according to the aforementioned at least one indication. When determining the first expected airtime of the aforementioned at least one first STA device connected to the first wireless communications device and the second expected airtime of the aforementioned at least one second STA device at least according to the aforementioned at least one indication, the first wireless communications device such as the AP device 110_0 may parse the aforementioned at least one first packet to obtain the aforementioned at least one indication from the aforementioned at least one first packet, for indicating the second STA count of the aforementioned at least one second STA device, and determine the first expected airtime of the aforementioned at least one first STA device and the second expected airtime of the aforementioned at least one second STA device according to both of the first STA count of the aforementioned at least one first STA device (e.g., the n STA devices of the embodiments shown in FIG. 3A and FIG. 4A) and the second STA count of the aforementioned at least one second STA device (e.g., the (N−n) other STA devices of the embodiments shown in FIG. 3A and FIG. 4A, in particular, the m STA devices of the embodiment shown in FIG. 3A, or the (m+o) STA devices of the embodiment shown in FIG. 4A). For example, the aforementioned at least one indication may comprise the second STA count of the aforementioned at least one second STA device, and more particularly, may further comprise the aforementioned at least one MAC address of the aforementioned at least one other wireless communications device (e.g., the X AP devices 110_1 . . . and 110_X configured as the X agents #1 . . . #X), but the present invention is not limited thereto. According to some embodiments, at least one AP device 110 among the AP devices {110} within the wireless communications system 100, such as at least one AP device among the AP device 110_0 configured as the controller and the X AP devices 110_1 . . . and 110_X configured as the X agents #1. #X, may operate according to the runtime topology control scheme to perform similar operations.

As shown in FIG. 5, when X=1 and Y≥3, the AP device 110_0 configured as the controller may have an abstraction layer (AL) MAC address $MAC\_Add_{CONTROLLER}$ and the AP device 110_1 configured as the agent #1 may have an AL MAC address $MAC\_Add_{AGENT}$(1) (labeled "AL_MAC: $MAC\_Add_{CONTROLLER}$" and "AL_MAC: $MAC\_Add_{AGENT}$(1)" for brevity), and the STAs #0, #1, #2 and #3 may have their own MAC addresses $MAC\_Add_{STA}$(0), $MAC\_Add_{STA}$(1), $MAC\_Add_{STA}$(2) and $MAC\_Add_{STA}$(3) (respectively labeled "MAC: $MAC\_Add_{STA}$(0)", "MAC: $MAC\_Add_{STA}$(1)", "MAC: $MAC\_Add_{STA}$(2)" and "MAC: $MAC\_Add_{STA}$(3)" for brevity), where the map version MAP_Version may be equal to the version R3, the associated channel number of the controller and the agent #1 may be equal to channel #60 or #5, the medium of the agent #1 may be the air medium of 5 gigahertz (GHz) frequency band (labeled "5G" for brevity), the medium of the STA #0 may be the Ethernet, and the service set identifier (SSID) of the mesh network may be equal to Multi-AP-5LG-2.

Based on the runtime topology control scheme, the AP device 110_0 configured as the controller may receive one or more packets from one or more leaf architectures corresponding to the X AP devices 110_1 . . . and 110_X configured as the X agents #1 . . . #X (e.g., the 1st leaf architecture corresponding to the AP device 110_1 configured as the 1st agent #1), parse the one or more packets to obtain one or more indications from the one or more packets, for indicating a second total STA count of a second set of STAs (e.g., some currently connected STA devices of the one or more leaf architectures), and determine a first total expected airtime of a first set of STAs connected to the AP device 110_0 configured as the controller and a second total expected airtime of the second set of STAs according to a first total STA count of the first set of STAs and the second total STA count of the second set of STAs. For example, the first set of STAs may represent the aforementioned at least one first STA device (e.g., the n STA devices of the embodiments shown in FIG. 3A and FIG. 4A), and the second set of STAs may represent the aforementioned at least one second STA device (e.g., the (N−n) other STA devices of the embodiments shown in FIG. 3A and FIG. 4A), where the first total expected airtime and the second total STA count may represent the first STA count and the second STA count, respectively. For brevity, similar descriptions for this embodiment are not repeated in detail here.

According to some embodiments, the one or more packets received and parsed by the AP device 110_0 configured as the controller may be implemented by way of one or more topology responses, one or more topology response messages, etc., and the one or more indications obtained from the one or more packets by parsing the one or more packets may be implemented by way of one or more AL MAC addresses among all AL MAC addresses of the (X+1) AP devices acting as the (X+1) mesh APs 101, basic service set (BSS) information regarding one or more BSSs among all BSSs within the mesh network, and all the STAs connected to the one or more leaf architectures. In addition, the AP device 110_0 configured as the controller may parse the associated client devices, and more particularly, may check if there is any new STA per BSS. For example, when determining that there is a new STA in a certain BSS among all BSSs within the mesh network, the AP device 110_0 configured as the controller may add this new STA into a currently connected STAs table corresponding to the one or more leaf architectures, for indicating the latest currently connected STAs of the one or more leaf architectures. For brevity, similar descriptions for these embodiments are not repeated in detail here.

TABLE 1

| Field | Length | Value | Description |
|---|---|---|---|
| tlvType | 1 octet | 3 | Device information type. |
| tlvLength | 2 octets | Variable | Number octets in ensuing field. |
| tlvValue | 6 octets | | 1905.1 AL MAC address of the device. |
| | 1 octet | k | Number of local interfaces. |
| | 6 octets | Any EUI-48 value | MAC address of the local interface. |
| | 2 octets | | Media type of the local interface (as defined in the "Media type" and "Description" columns of Table 6-12). |
| | 1 octet | n | Number of octets in ensuing field. |
| | n octets | | Media-specific information of the local interface (as defined in the "Media-specific information" column of Table 6-12. |
| | | | The above four fields are repeated k − 1 times. |

TABLE 2

| Field | Length | Value | Description |
|---|---|---|---|
| tlvType | 1 octet | 4 | Device bridging capability. |
| tlvLength | 2 octets | Variable | Number of octets in ensuing field. |
| tlvValue | 1 octet | m | m is the total number of bridging tuples in this TLV. |
| | 1 octet | k | Number of MAC addresses in this bridging tuple. |
| | 6 octets | Any EUI-48 value | The MAC address of a 1905.1 device's network interface that belongs to this bridging tuple. |
| | | | The above field is repeated k − 1 times. |
| | | | The above two felds are repeated m − 1 times. |

TABLE 3

| Field | Length | Value | Description |
|---|---|---|---|
| tlvType | 1 octet | 6 | List of connected non-1905 neighbor devices. |
| tlvLength | 2 octets | Variable | Number of octets in ensuing field. |
| tlvValue | 6 octets | Any EUI-48 value | MAC address of the local interface. |
| | 6 octets | Any EUI-48 value | MAC address of non-1905 neighbor device. |
| | | | The above field is repeated 0 or more times. |

TABLE 4

| Field | Length | Value range | Description |
|---|---|---|---|
| tlvType | 1 octet | 7 | Information on 1905.1 neighbor device. |
| tlvLength | 2 octets | Any integer value | Number of octets in ensuing field. |
| tlvValue | 6 octets | Any EUI-48 value | MAC address of the local interface. |
| | 6 octets | Any EUI-48 value | 1905.1 AL MAC address of 1905.1 neighbor. |
| | 1 bit (Bit 7) | 0 or 1 | Existence of IEEE 802.1 bridges: 0: no IEEE 802.1 bridges exist. 1: at least one IEEE 802.1 bridge exists between this device and the neighbor. |
| | 7 bits (Bits 6 to 0) | All zeroes | Reserved. |
| | | | The above three fields are repeated 0 or more times. |

TABLE 5

| Field | Length | Value | Description |
|---|---|---|---|
| tlvType | 1 octet | 0x80 | Supported service information TLV. |
| tlvLength | 2 octets | Variable | Number of octets in ensuing field. |
| tlvValue | 1 octet | k | List of supported service(s). |
| | 1 octet | 0x00: Multi-AP Controller 0x01: Multi-AP Agent 0x02 − 0xFF: Reserved | Supported service. |
| | The above field is repeated k − 1 times. | | |

TABLE 6

| Field | Length | Value | Description |
|---|---|---|---|
| tlvType | 1 octet | 0x83 | AP Operational BSS TLV. |
| tlvLength | 2 octets | Variable | Number of octets in ensuing field. |
| tlvValue | 1 octet | k | Number of radios reported. |
| | 6 octets | Variable | Radio Unique Identifier of a radio. |
| | 1 octet | m | Number of BSS (802.11 Local Interface) currently operating on the radio. |
| | 6 octets | Variable | MAC Address of Local Interface (equal to BSSID) operating on the radio. |
| | 1 octet | n | SSID length |
| | n octets | Variable | SSID |
| | The above 3 fields are repeated m − 1 times (if m = 0, these fields are omitted). | | |
| | The above 5 fields are repeated k − 1 times. | | |

TABLE 7

| Field | Length | Value | Description |
|---|---|---|---|
| tlvType | 1 octet | 0x84 | Associated Client TLV. |
| tlvLength | 2 octets | Variable | Number of octets in ensuing field. |
| tlvValue | 1 octet | k | Number of BSSs included in this TLV. |
| | 6 octets | Any EUI-48 value | The BSSID of the BSS operated by the Multi-AP Agent in which the client is associated. |
| | 2 octets | m | Number of clients associated to the BSS. |
| | 6 octets | Any EUI-48 value | The MAC address of the associated 802.11 client. |

TABLE 7-continued

| Field | Length | Value | Description |
|---|---|---|---|
| | 2 octets | 0x0000 – 0xFFFE: 0-65,534<br>0xFFFF: 65,535 or higher | Time since the 802.11 client's last association to this Multi-AP device in seconds. |
| | The above 2 fields are repeated m − 1 times (if m = 0, these fields are omitted). | | |
| | The above 4 fields are repeated k − 1 times. | | |

Table 1 illustrates an example of the 1905.1 device information type TLV (or Type-Length-Value), Table 2 illustrates an example of the device bridging capability TLV, Table 3 illustrates an example of the non-1905 neighbor device list TLV, Table 4 illustrates an example of the 1905.1 neighbor device TLV, Table 5 illustrates an example of the SupportedService (or Supported-Service) TLV format, Table 6 illustrates an example of the AP Operational BSS TLV format, and Table 7 illustrates an example of the Associated Clients TLV format. Regarding parsing information such as the AL MAC addresses, all the BSS and all the STA connected, some associated field arranged to carry the information to be parsed may be described as follows. A beginning part of "6.3.3 Topology response message format" in the IEEE 1905 standards may be shown below:

| |
|---|
| One device information type TLV (see Table 6-10) |
| Zero or more device bridging capability TLVs (see Table 6-11) |
| If a 1905.1 device has more than one interface, then the 1905.1 management entity shall include one device bridging capability TLV. |
| Zero or more non-1905 neighbor device list TLVs (see Table 6-14) |
| If a 1905.1 management entity infers the presence of a non-1905.1 neighbor device (see 8.1), then it shall include that device in the non-1905.1 neighbor device list TLV. |
| Zero or more 1905.1 neighbor device TLVs (see Table 6-15) |
| If a 1905.1 management entity infers the presence of a 1905.1 neighbor device (see 8.1), then it shall include that device in the 1905.1 neighbor device TLV. |

where Table 1, Table 2, Table 3 and Table 4 may have the same or similar table contents as that of the "Table 6-10", the "Table 6-11", the "Table 6-14" and the "Table 6-15" mentioned in the beginning part shown above, respectively. For example, the first 6 octets of the field "tlvValue" as shown in Table 1 may be arranged to carry the AL MAC address. In addition, a beginning part of "17.1.4 1905 Topology Response message format (extended)" in the Multi-AP (MAP) specification v1.0 (or version 1.0) may be shown below:

The following TLV shall also be included in this message, in addition to TLVs listed [2]:

| |
|---|
| Zero or one SupportedService TLV (see section 17.2.1). |
| One AP Operational BSS TLV (see section 17.2.4). |
| Zero or one Associated Clients TLV (see section 17.2.5). |

where Table 5, Table 6 and Table 7 may have the same or similar table contents as that of the "Table 6", the "Table 9" and the "Table 10" mentioned in the MAP specification v1.0, respectively. For example, the 6 octets corresponding to the description of "The MAC address of the associated 802.11 client" (or the 6 octets coming after the first (1+6+2) octets) in the field "tlvValue" as shown in Table 7 may be arranged to carry the MAC address of the associated 802.11 client, for indicating the associated clients with the last two fields (e.g., the field of this 6 octets and the next field) which may be repeated m−1 times. As a result, all the STAs connected to the one or more leaf architectures may be reported with the 6-octets fields like this.

According to some embodiments, the aforementioned at least one AP device 110 among the AP devices {110} within the wireless communications system 100 may operate according to the runtime topology control scheme to determine the runtime topology of the mesh network, and more particularly, receive one or more packets from one or more leaf architectures corresponding to one or more AP devices among the AP devices {110}, parse the one or more packets to obtain one or more indications from the one or more packets, for indicating a second total STA count of a second set of STAs (e.g., some currently connected STA devices of the one or more leaf architectures), and determine a first total expected airtime of a first set of STAs connected to the aforementioned at least one AP device 110 and a second total expected airtime of the second set of STAs according to a first total STA count of the first set of STAs and the second total STA count of the second set of STAs. For brevity, similar descriptions for these embodiments are not repeated in detail here.

Figure 6:
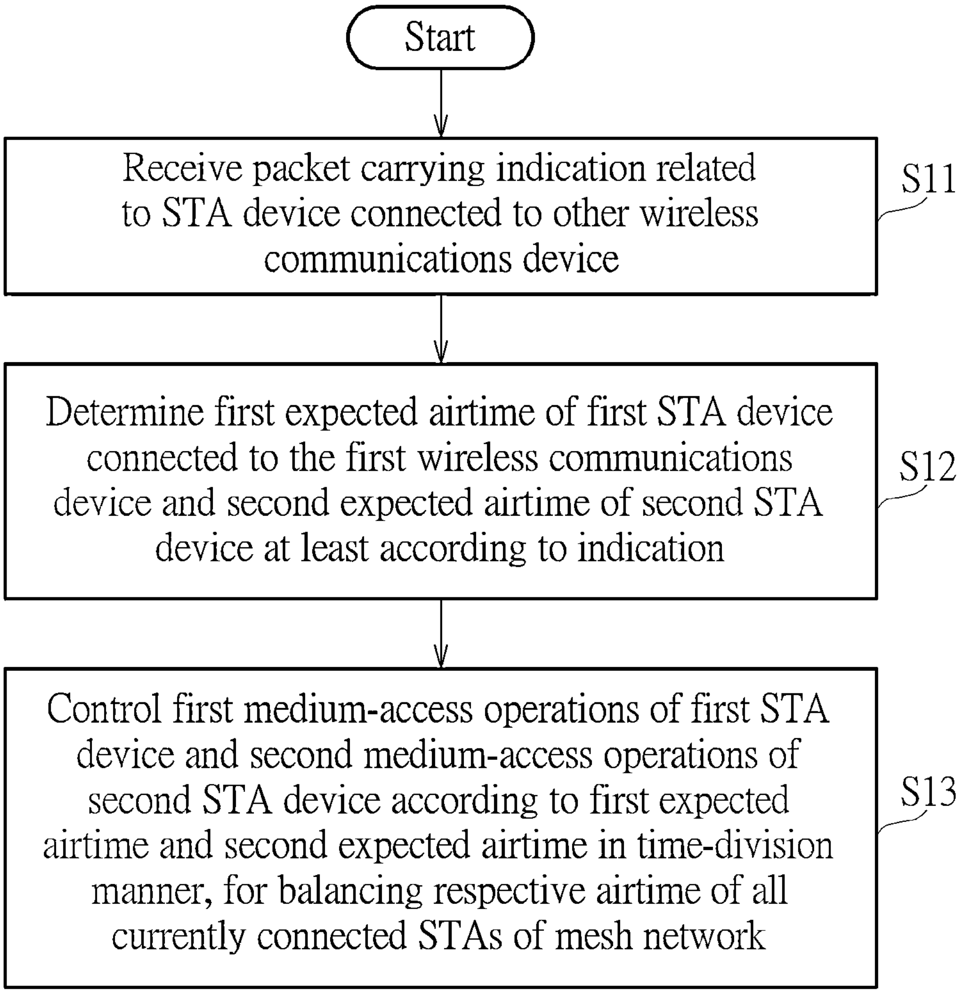
FIG. 6 illustrates a working flow of the method according to an embodiment of the present invention.

FIG. 6 illustrates a working flow of the method according to an embodiment of the present invention. For example, the associated apparatus comprising the first wireless communications device may operate according to the working flow shown in FIG. 6.

In Step S11, the first wireless communications device such as the AP device 110_0 may receive the aforementioned at least one first packet carrying the aforementioned at least one indication related to the aforementioned at least one second STA device connected to the aforementioned at least one other wireless communications device (e.g., the X AP devices 110_1 . . . and 110_X configured as the X agents #1 . . . #X) from the second wireless communications device such as the AP device 110_1.

In Step S12, the first wireless communications device such as the AP device 110_0 may determine the first expected airtime (e.g., the total expected airtime such as the summation (Expected_Airtime(1)+ . . . +Expected_Airtime (n) of the aforementioned at least one first STA device (e.g., the n STA devices of any embodiment among the embodiments respectively shown in FIG. 3A and FIG. 4A) connected to the first wireless communications device and the second expected airtime (e.g., the total expected airtime such as the summation (Expected_Airtime(n+1)+ . . . +Expected_Airtime(N))) of the aforementioned at least one second STA device (e.g., the (N−n) other STA devices of the aforementioned any embodiment among the embodiments respectively shown in FIG. 3A and FIG. 4A) at least according to the aforementioned at least one indication.

In Step S13, the first wireless communications device such as the AP device 110_0 may control the first medium-access operations of the aforementioned at least one first STA device (e.g., the n STA devices) and the second medium-access operations of the aforementioned at least one second STA device (e.g., the (N−n) other STA devices)

according to the first expected airtime (e.g., the total expected airtime such as the summation (Expected_Airtime (1)+ . . . +Expected_Airtime(n))) and the second expected airtime (e.g., the total expected airtime such as the summation (Expected_Airtime(n+1)+ . . . +Expected_Airtime(N))) in the time-division manner, for balancing the respective airtime (e.g., the expected airtimes Expected_Airtime(1), Expected_Airtime(2), . . . and Expected_Airtime(N)) of all currently connected STA devices (e.g., the STA devices 120_1, 120_2, . . . and 120_N) of the mesh network.

More particularly, the first wireless communications device (e.g., the AP device 110_0) may be arranged to control the first medium-access operations of the aforementioned at least one first STA device (e.g., the n STA devices) and control, through the second wireless communications device (e.g., the AP device 110_1), the second medium-access operations of the aforementioned at least one second STA device (e.g., the (N−n) other STA devices) according to the first expected airtime and the second expected airtime in the time-division manner, for balancing the respective airtime of all currently connected STA devices of the mesh network. The first wireless communications device (e.g., the AP device 110_0) configured as the controller of the mesh network may control the whole mesh network with the aid of the aforementioned at least one other wireless communications device (e.g., the X AP devices 110_1 . . . and 110_X configured as the X agents #1 . . . #X). For brevity, similar descriptions for this embodiment are not repeated in detail here.

For better comprehension, the method may be illustrated with the working flow shown in FIG. 6, but the present invention is not limited thereto. According to some embodiments, one or more steps may be added, deleted, or changed in the working flow shown in FIG. 6. For example, as Y=N, the expected airtimes Expected_Airtime(1), Expected_Airtime(2), . . . and Expected_Airtime(N) of the STA devices 120_1, 120_2, . . . and 120_N mentioned in the operation of Step S13 may be replaced with the expected airtimes Expected_Airtime(1), Expected_Airtime(2), . . . and Expected_Airtime(Y) of the STA devices 120_1, 120_2, . . . and 120_Y. For another example, the associated apparatus comprising the second wireless communications device (e.g., the AP device 110_1 among the AP devices 110_1 and 110_2 shown in FIG. 4A) may operate according to the working flow shown in FIG. 6 to perform similar operations with respect to the leaf architecture corresponding to the second wireless communications device. For yet another example, the associated apparatus comprising the second wireless communications device may send the aforementioned at least one first packet carrying the aforementioned at least one indication to the first wireless communications device, to allow the first wireless communications device to operate according to the working flow shown in FIG. 6. In some examples, the associated apparatus comprising both of the first wireless communications device and the second wireless communications device may operate according to the working flow shown in FIG. 6. For brevity, similar descriptions for these embodiments are not repeated in detail here.

According to some embodiments, regarding the associated apparatus comprising at least one wireless communications device (e.g., the aforementioned at least one AP device 110 among the AP devices {110} within the wireless communications system 100), the first wireless communications device (e.g., the AP device 110_0) may be arranged to control the first medium-access operations of the aforementioned at least one first STA device (e.g., the n STA devices) and control, through the second wireless communications device (e.g., the AP device 110_1), the second medium-access operations of the aforementioned at least one second STA device (e.g., the (N−n) other STA devices) according to the first expected airtime and the second expected airtime in the time-division manner, for balancing the respective airtime of all currently connected STA devices (e.g., the STA devices 120_1, 120_2, . . . and 120_N) of the mesh network. In addition, the first wireless communications device (e.g., the AP device 110_0) may be arranged to control, through the second wireless communications device (e.g., the AP device 110_1), the third medium-access operations of the one or more second STA devices and the fourth medium-access operations of the aforementioned at least one remaining second STA device according to the third expected airtime and the fourth expected airtime in the time-division manner, for balancing the respective airtime of all currently connected STA devices (e.g., the STA devices 120_1, 120_2, . . . and 120_N) of the mesh network. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing airtime fairness control of a mesh network, the mesh network comprising a first wireless communications device and at least one other wireless communications device, the method comprising:
- utilizing the first wireless communications device to receive at least one first packet from a second wireless communications device among the at least one other wireless communications device, the at least one first packet carrying at least one indication related to at least one second station (STA) device connected to the at least one other wireless communications device;
- determining a first expected airtime of at least one first STA device connected to the first wireless communications device and a second expected airtime of the at least one second STA device at least according to the at least one indication and a topology of the first wireless communications device and the second wireless communications device; and
- adjusting the first expected airtime and the second expected airtime by controlling first medium-access operations of the at least one first STA device and second medium-access operations of the at least one second STA device in a time-division manner, for equalizing respective airtime of all currently connected STA devices of the mesh network.

2. The method of claim 1, wherein the first wireless communications device and the at least one other wireless communications device are access point (AP) devices.

3. The method of claim 1, wherein the at least one first STA device is wirelessly connected to the first wireless communications device via at least one first wireless connection, and the at least one second STA device is wirelessly connected to the at least one other wireless communications device via at least one second wireless connection.

4. The method of claim 1, wherein the first medium-access operations comprise downlink (DL) wireless transmission operations regarding the at least one first STA device, and the second medium-access operations comprise DL wireless transmission operations regarding the at least one second STA device.

5. The method of claim 4, wherein the first medium-access operations comprise uplink (UL) wireless transmission operations regarding the at least one first STA device, and the second medium-access operations comprise UL wireless transmission operations regarding the at least one second STA device.

6. The method of claim 1, wherein the first medium-access operations comprise uplink (UL) wireless transmission operations regarding the at least one first STA device, and the second medium-access operations comprise UL wireless transmission operations regarding the at least one second STA device.

7. The method of claim 1, wherein the first medium-access operations comprise both of wireless transmission operations to the at least one first STA device and wireless transmission operations from the at least one first STA device; and the second medium-access operations comprise both of wireless transmission operations to the at least one second STA device and wireless transmission operations from the at least one second STA device.

8. The method of claim 1, wherein the first expected airtime is equal to (n/N), and the second expected airtime is equal to ((N−n)/N), where "n" represents a first STA count of the at least one first STA device, and "N" represents a total STA count of the at least one first STA device and the at least one second STA device.

9. The method of claim 8, wherein adjusting the first expected airtime of the at least one first STA device connected to the first wireless communications device and the second expected airtime of the at least one second STA device further comprises:

determining an adjusted airtime of each first STA device among the at least one first STA device to be equal to (1/N); and determining an adjusted airtime of each second STA device among the at least one second STA device to be equal to (1/N).

10. The method of claim 1, wherein a wireless communications device count of the at least one other wireless communications device is greater than one; and the method further comprises:

determining a third expected airtime of one or more second STA devices connected to the second wireless communications device and a fourth expected airtime of at least one remaining second STA device among the at least one second STA device at least according to the at least one indication, wherein the at least one second STA device comprises the one or more second STA devices and the at least one remaining second STA device; and adjusting the third expected airtime and the fourth expected airtime by controlling third medium-access operations of the one or more second STA devices and fourth medium-access operations of the at least one remaining second STA device in the time-division manner, for equalizing the respective airtime of said all currently connected STA devices of the mesh network, wherein the second medium-access operations comprise the third medium-access operations and the fourth medium-access operations.

11. The method of claim 10, wherein the second expected airtime is equal to a summation of the third expected airtime and the fourth expected airtime.

12. The method of claim 10, wherein the first expected airtime is equal to (n/N), and the second expected airtime is equal to ((N−n)/N), where "n" represents a first STA count of the at least one first STA device, and "N" represents a total STA count of the at least one first STA device and the at least one second STA device; and the third expected airtime is equal to (m/N), and the fourth expected airtime is equal to ((N−n−m)/N), where "m" represents a third STA count of the one or more second STA devices.

13. The method of claim 12, wherein adjusting the third expected airtime of the one or more second STA devices connected to the second wireless communications device and the fourth expected airtime of the at least one remaining second STA device among the at least one second STA device further comprises:

determining an adjusted airtime of each second STA device among the one or more second STA devices to be equal to (1/N); and determining an adjusted airtime of each second STA device among the at least one remaining second STA device to be equal to (1/N).

14. The method of claim 1, wherein the at least one indication comprises one or a combination of at least one medium access control (MAC) address of the at least one other wireless communications device and a second STA count of the at least one second STA device.

15. The method of claim 1, wherein determining the first expected airtime of the at least one first STA device connected to the first wireless communications device and the second expected airtime of the at least one second STA device at least according to the at least one indication further comprises:

parsing the at least one first packet to obtain the at least one indication from the at least one first packet, for indicating a second STA count of the at least one second STA device; and determining the first expected airtime of the at least one first STA device and the second expected airtime of the at least one second STA device according to both of a first STA count of the at least one first STA device and the second STA count of the at least one second STA device.

16. The method of claim 15, wherein the at least one indication comprises the second STA count of the at least one second STA device.

17. An apparatus that operates according to the method of claim 1, wherein the apparatus comprises the first wireless communications device, wherein:

the first wireless communications device is arranged to determine the first expected airtime of the at least one first STA device and the second expected airtime of the at least one second STA device at least according to the at least one indication and a topology of the first wireless communications device and the second wireless communications device; and the first wireless communications device is arranged to adjust the first expected airtime and the second expected airtime by controlling the first medium-access operations of the at least one first STA device and controlling, through the second wireless communications device, the second medium-access operations of the at least one second STA device in the time-division manner, for equalizing the respective airtime of said all currently connected STA devices of the mesh network.

18. The apparatus of claim 17, wherein a wireless communications device count of the at least one other wireless communications device is greater than one, wherein:

the first wireless communications device is arranged to determine a third expected airtime of one or more second STA devices connected to the second wireless communications device and a fourth expected airtime of at least one remaining second STA device among the at least one second STA device at least according to the at least one indication, wherein the at least one second STA device comprises the one or more second STA devices and the at least one remaining second STA device; and the first wireless communications device is arranged to adjust the third expected airtime and the fourth expected airtime by controlling, through the second wireless communications device, third medium-access operations of the one or more second STA devices and fourth medium-access operations of the at least one remaining second STA device in the time-division manner, for equalizing the respective airtime of said all currently connected STA devices of the mesh network, wherein the second medium-access operations comprise the third medium-access operations and the fourth medium-access operations.

19. An apparatus that operates according to the method of claim 1, wherein the apparatus comprises the second wireless communications device, wherein:

the second wireless communications device is arranged to send the at least one first packet carrying the at least one indication to the first wireless communications device;

the first wireless communications device is arranged to determine the first expected airtime of the at least one first STA device and the second expected airtime of the at least one second STA device at least according to the at least one indication and a topology of the first wireless communications device and the second wireless communications device; and the first wireless communications device is arranged to adjust the first expected airtime and the second expected airtime by controlling the first medium-access operations of the at least one first STA device and controlling, through the second wireless communications device, the second medium-access operations of the at least one second STA device in the time-division manner, for equalizing the respective airtime of said all currently connected STA devices of the mesh network.

20. The apparatus of claim 19, wherein a wireless communications device count of the at least one other wireless communications device is greater than one, wherein:

the first wireless communications device is arranged to determine a third expected airtime of one or more second STA devices connected to the second wireless communications device and a fourth expected airtime of at least one remaining second STA device among the at least one second STA device at least according to the at least one indication, wherein the at least one second STA device comprises the one or more second STA devices and the at least one remaining second STA device; and the first wireless communications device is arranged to adjust the third expected airtime and the fourth expected airtime by controlling, through the second wireless communications device, third medium-access operations of the one or more second STA devices and fourth medium-access operations of the at least one remaining second STA device in the time-division manner, for equalizing the respective airtime of said all currently connected STA devices of the mesh network, wherein the second medium-access operations comprise the third medium-access operations and the fourth medium-access operations.

* * * * *